April 17, 1951   B. G. WALTERS   2,549,147
PORTABLE KNIFE GRINDER FOR WOODWORKING MACHINES
Filed Jan. 29, 1948   2 Sheets-Sheet 1

Inventor
Bruce G. Walters
By Fishburn & Mullendore
Attorneys

April 17, 1951  B. G. WALTERS  2,549,147
PORTABLE KNIFE GRINDER FOR WOODWORKING MACHINES
Filed Jan. 29, 1948  2 Sheets-Sheet 2
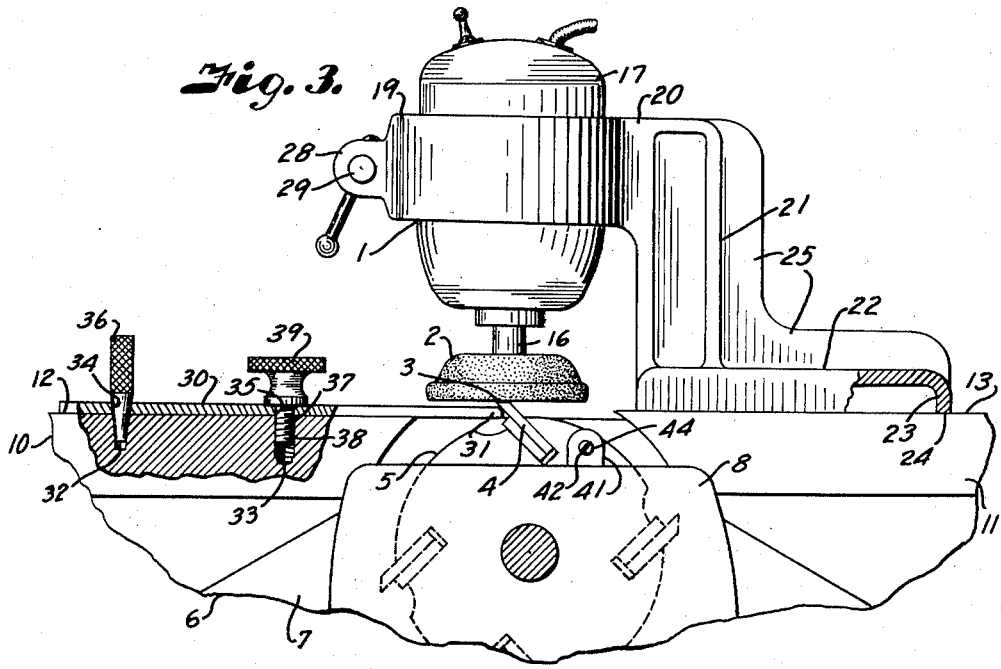
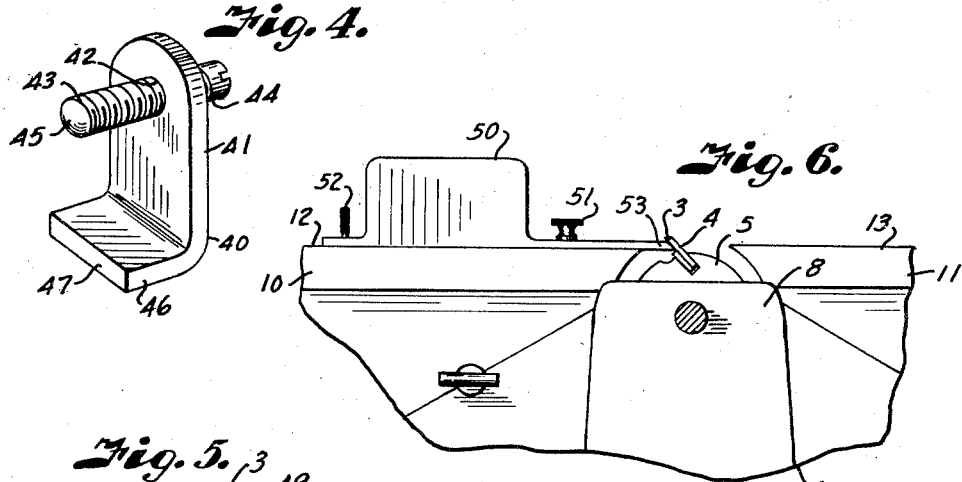
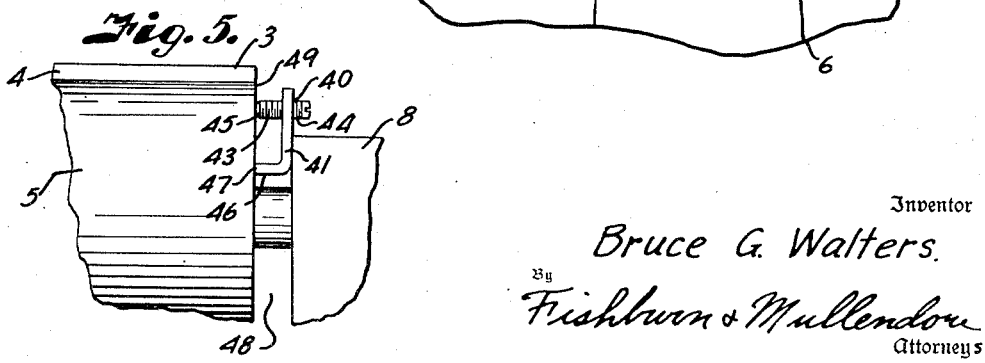
Inventor
Bruce G. Walters.
By Fishburn & Mullendore
Attorneys Patented Apr. 17, 1951

2,549,147

UNITED STATES PATENT OFFICE 2,549,147

PORTABLE KNIFE GRINDER FOR WOOD-WORKING MACHINES

Bruce G. Walters, Elsinore, Calif.

Application January 29, 1948, Serial No. 5,015

1 Claim. (Cl. 51—173)

This invention relates to devices for grinding straight cutting edges on knives of woodworking machines, for example jointers, planers and the like, and more particularly to cooperating blade blocking and grinding devices for accurately grinding the cutting edges of the knives while the same are secured to the cutter head in the machine, each edge being ground parallel with the surface of the finished work supporting table of the machine.

Heretofore various devices have been used for sharpening the cutting blades of woodworking machinery while the blades are in the cutter head of the machine, but such devices have consisted of complicated arrangements of rails and arms necessarily made of special sizes to function on particular machines. Also such devices require careful adjustment and leveling in order to obtain an approximation of a cutting edge parallel to the work supporting table, thereby requiring considerable time for setting up the grinding apparatus and still being subject to inaccuracies depending upon the skill of the workman. Long arms and overhanging mounting of rails have also subjected the apparatus to vibration which impairs the accuracy to which the blades must be ground. Efforts to overcome the inaccuracies due to vibration have resulted in such heavy equipment that often two men are required to handle the apparatus. Due to the deficiencies of such devices it is common practice to remove the blades from the cutter head and/or remove the cutter head and sharpen the blades while disassembled from the woodworking machine. This also results in the consumption of considerable time and inaccuracies of the cutting edges relative to the surface of the work supporting tables.

The principal objects of the present invention are to overcome the above mentioned objections; to provide portable apparatus for grinding blades of jointers, planers and the like which obviate the necessity of removing the blades and/or cutter heads from the machine; to provide a single size apparatus operative on all sizes of jointers and the like; to provide blade grinding apparatus for grinding straight edges on the blades parallel to the finished work supporting table of the machine without any leveling and time consuming adjusting operation; to provide for accurately positioning and locking the cutter head for assuring the same clearance on each blade on the cutter head; to provide a removable mounting of the grinding motor on a support slidable on the work supporting table of this machine; and to provide a simple, efficient, durable and accurate apparatus of light weight with which one man may quickly position and easily grind the cutter blades of a jointer and the like.

In accomplishing these and other objects of the present invention, I have provided improved details of structure, the preferred form of which is illustrated in the accompanying drawings, wherein:

Fig. 3 is a side elevation of the portable grinder showing the position of the grinding wheel with respect to the cutter, portions of the forward table on the machine being broken away to illustrate the mounting of the blade stop thereon.

Fig. 4 is a perspective view of the cutter head locking device.

Fig. 5 is a fragmentary view of the cutter head and bearing housing therefor, with the cutter head locking clamp in locking position.

Fig. 6 is an elevational view of a modified form of cutter stop and lock in blade-engaging position.

Figure 1:
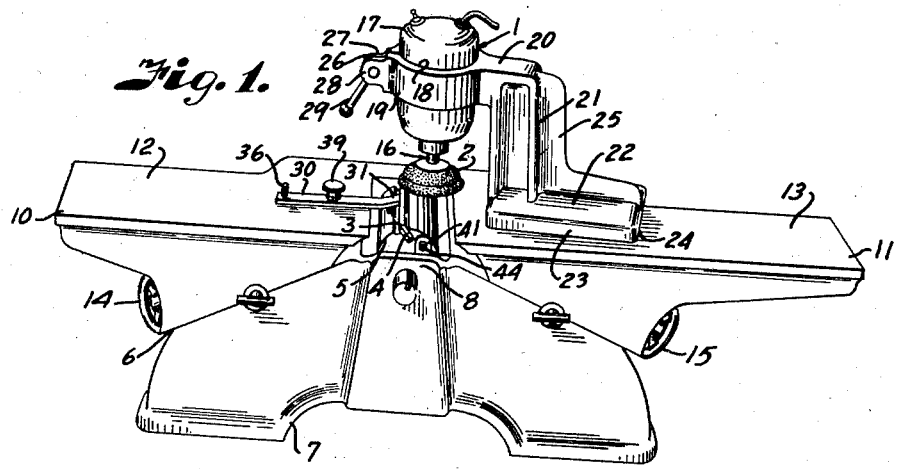
Fig. 1 is a perspective view of a portable grinder in position on a jointer for sharpening the blades in the cutter head thereof.

Referring more in detail to the drawings:

1 designates a grinder having a grinding wheel 2 preferably of cup shape adapted to grind the cutting edge 3 of blades 4 mounted in a cutting head 5 operatively positioned in the woodworking machine such as a jointer, planer and the like. In the illustrations the grinder is shown applied to a jointer 6 consisting of a base 7 having bearing housings 8 and 9 for rotatably supporting the cutter head 5 between the adjacent ends of the forward table 10 and rear table 11, the rear table being the support for the finished portion of the wood product processed by the machine.

The tables 10 and 11 are slidably mounted on ways on the base whereby the height of the work supporting surfaces 12 and 13 respectively of the tables may be varied relative to the cutting head, hand wheels 14 and 15 being provided for operating the mechanism on the machine for varying the height of said tables. The jointer shown is merely illustrative of such a machine as the present invention will function on any conventional jointer or planer.

Figure 2:
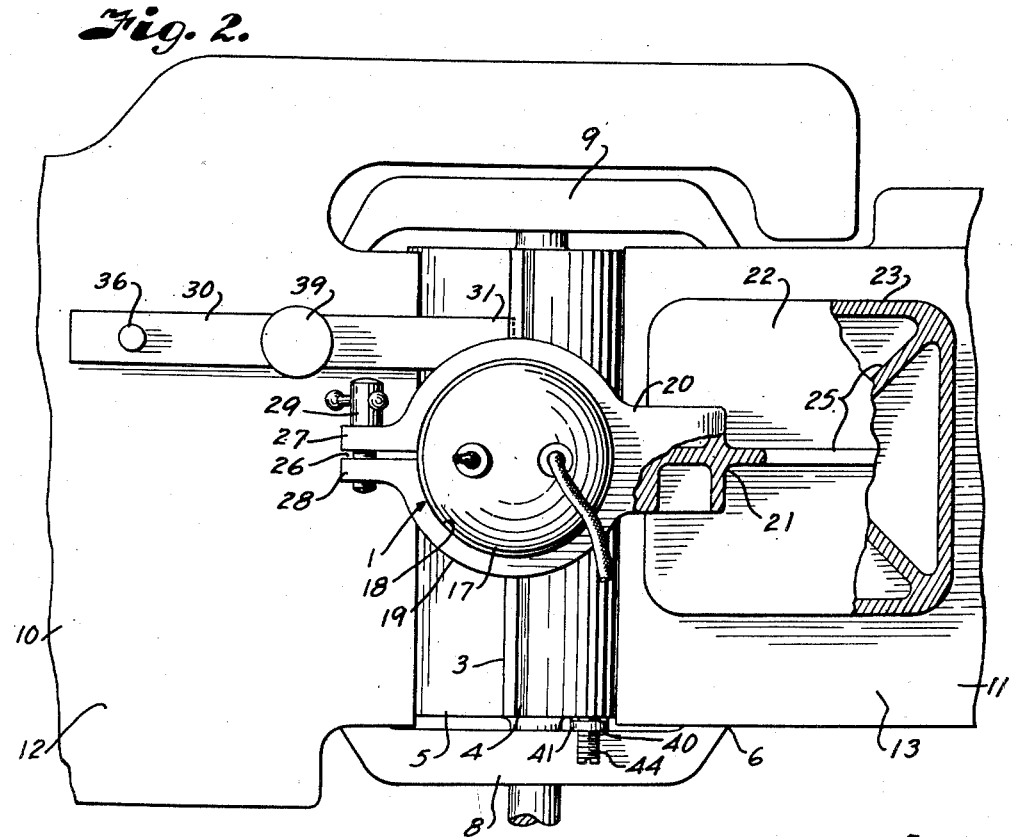
Fig. 2 is a plan view of the grinding apparatus on a jointer, portions of the grinder support being broken away to better illustrate the structure thereof.

The grinding wheel 2 is suitably mounted on a shaft 16 of a motor 17 preferably having a cylindrical housing adapted to fit in a bore 18 of a collar 19 carried on an arm 20 preferably projecting horizontally from and integral with a vertical post 21 extending upwardly from a base 22, said base having downwardly directed flanges 23 faced on their lower edges 24 to provide a smooth surface on said edges for engaging the upper surface 13 of the table 11. The collar 18, arm 20, post 21 and base 22 are preferably integral and may be formed by casting or the like and provided with suitable ribs 25 as shown in Figs. 1 and 2 to make a strong, rigid structure of relatively light weight.

The collar 18 has a slot 26 preferably diametrically opposite the arm 20 and ears 27 and 28 on opposite sides of the slot, said ears being suitably bored and threaded to receive a hand screw 29 for drawing the collar portions together into clamping engagement with the motor housing. This arrangement and mounting of the motor permits vertical adjustment of same and also the inverting of the motor whereby the grinding wheel will be located above the collar as when grinding the blades on the upper cutter head of a planer. It is preferable that the axis of the motor be arranged vertically or perpendicular to the plane of the surfaces of the lower edges 24 of the flanges 23 on the base, however, the motor axis may be arranged on an angle to permit hollow or concave grinding of the blades.

It is essential that the cutter head be held stationary during the grinding of each blade and that each blade on the cutter head be moved to the same grinding position as the next preceding blade in order that the clearance or bevel of the cutting edge will be the same on every blade of the cutter head. It is also desirable that each time the blades are ground the same preferred bevel will be maintained thereon.

In order to assure the identical positioning of the blades during each grinding thereof, a stop 30 is mounted on the forward table 10 whereby the end 31 thereof extends beyond the end of said table toward the table 11 and is adapted to engage the blades 4 on the cutter head 5. In order to assure the same mounting of the stop 30 for each grinding operation, the table 10 is provided with a tapered aperture 32 and a threaded aperture 33, arranged in longitudinal spaced relation on the table 10. The stop 30 is provided with apertures 34 and 35 in the table, whereby a tapered pin 36 may be inserted through the aperture 34 into the aperture 32 to accurately position the stop, and a screw 37 having a shank 38 which extends through the aperture 35 and is threaded into the aperture 33 whereby the head 39 of said screw engages the upper face of the stops 30 to secure said stop to the table. The stop 30 may be made of spring material whereby the end 31 thereof will ride over the respective blades as the cutter head is turned for moving the respective blades into grinding position, however, in order to provide a positive stop and eliminate the possibility of variations in the positioning of the blades by variation in pressure of the blade on the stop, and also to reduce wear on the stop, it is preferable that the member 30 be made of heavy, hard steel, and each time the cutter head is rotated to move the next blade into grinding position it is preferable that the screw 37 be backed off to loosen the stop and the tapered pin 36 removed from the apertures 32 and 34 whereby the stop may be pivoted on the screw 37 to move same from the path of the cutter blade. When the next blade is moved into grinding position, the stop is pivoted to move the end 31 thereof into blade-engaging position, the tapered pin 36 reinserted in the apertures 32 and 34 and the screw 37 righted to again position the stop in the identical position it held during the grinding of the next preceding blade.

When the blades are in grinding position and engaging the end 31 of the stop, the cutter head is locked against rotation. The locking device 40 consists preferably of a vertically arranged bar portion 41 having a threaded aperture 42 adjacent the upper end thereof into which is threaded the threaded shank 43 of a setscrew 44, the shank preferably terminating in a rounded end 45. The lower end of the bar 41 is provided with an inturned flange 46 preferably of such size that the spacing between the edge 47 and the outer face of the bar 41 is slightly less than the spacing 48 between the cutter head 5 and the bearing housing 8. In order to lock the cutter head against rotation, the member 40 is inserted between the cutter head and the bearing 8 until the screw will engage the end face 49 of the cutter head. The screw 44 is then tightened whereby the pressure exerted by the screw tends to force the upper end of the lock outwardly as shown in Fig. 5 with the upper end of the bearing housing 8 serving as a fulcrum whereby both of the ends 47 of the flange 46 and the end 45 of the screw engage and exert locking pressure on the cutter head 5. The round end 45 of the screw will not mar the end of the cutter head, therefore, there would be no difficulty created in subsequent grinding operations as would be the case if the screw were attempting to return to a slightly offset recess caused by previous engagement of the screw with the cutter head.

In operating the device to sharpen blades of woodworking equipment, the stop 30 is placed on the table 10 with the apertures 34 and 35 aligning with the apertures 32 and 33 respectively, and the tapered pin inserted in the apertures 32 and 34 and the screw 37 threaded into the aperture 33 to clamp the stop onto the table. The hand wheel 14 is then rotated to lower the table 10 until the upper surface of the stop 30 is below the cutting edges of the blades 4 and the cutting head 5. The cutting head is then rotated in an anticlockwise direction, Fig. 3, to move the next adjacent blade into engagement with the end 31 of the stop 30 and the locking device inserted between the cutter head and the bearing housing 8. The set screw 44 is then rotated to move the end 45 thereof into engagement with the cutter head applying leverage to the bar member 41 and flange 46 providing sufficient pressure on the cutter head and bearing housing to lock the cutter head against rotation. The grinder bracket with the motor 17 clamped in the collar 19 is placed on the surface 13 of the rear table of the woodworking machine. The handwheel 15 is then rotated to raise or lower the table 11 whereby when the lower edges 24 of the flanges 23 on the base 22 are resting on the upper face 13 of the table 11, the grinding wheel 2 will barely touch the cutting edge of the blade 4. The grinding wheel is then moved along the cutting edge of the blade by the operator sliding the grinder bracket over the surface 13 of the table. It is preferable that the operator apply some pressure on the base 22 to hold same engaged with the table top, however, there is sufficient weight in the structure that very little downward pressure is necessary so the operator may easily move the grinding wheel over the cutting edges of the blades. It is often found that the surface 12 on the forward table is not exactly parallel with the surface 13 on the rear table, however in finishing wood products, as by a jointer or planer, it is desirable that the cutting edge of the blade be parallel with the surface of the table upon which the finished work is moved as it passes over the cutter. Therefore by moving the grinder bracket over the surface of the finished work-supporting table, the cutting edges of the blades are maintained parallel with said surface and any inaccuracies in alignment between the forward and rear table do not effect the quality of the work performed on the machine. After the grinding wheel is moved over the cutting edge and it is desirable to grind additional metal from the cutting edge the hand wheel 15 is rotated to lower the table 11 to permit the additional grinding of the cutter. After a grinding cut is taken on each blade, the screw 37 is loosened and the taper pin 36 removed whereby the stop may be pivoted on the screw to move the end 31 out of the path of the cutting blade. The screw 44 is loosened, the lock removed to permit rotation of the cutter head, and after the ground blade is moved in a counterclockwise direction whereby the stop 30 will clear same, the stop is moved back into normal position, the pin 36 reinserted and the screw 37 tightened to clamp the stop in place. The cutter head is then rotated to move the next blade into grinding position in engagement with the end 31 of the stop and the lock for the cutter head reapplied to hold same stationary during the grinding of said blades. This operation is repeated for each blade and then the table 11 lowered for additional grinding and the same process again repeated until all of the blades on the cutter head have been ground and sharpened, said edges all being parallel with the surface 13 of the table 11 and each of the cutting edges being the same radial distance from the axis of the cutter head.

A modified form of cutter head, stop and lock are illustrated in Fig. 6. In this form of the invention an electrical magnet is placed in a housing 50 secured to the surface 12 of the table 10, by means of a screw 51 and tapered pin 52 in the same manner as the stop 30 is secured to the table as shown in Fig. 3. The core of the magnet is arranged whereby an extension thereof extends toward the cutter head and the end 53 of the core is positioned for engagement by blades 4 on the cutter head 5. With this arrangement the stop is moved out of position of the blade in the same manner as the stop 30 whereby the next succeeding blade may be brought into position to be engaged by the end 53. With the stop secured to the table by the screw 51 and pin 52, current is applied to the winding of the magnet, providing a magnetic attraction in the end 53 of the core, drawing the blade 4 into engagement with said core and holding same during the grinding operation. With this arrangement the end 53 serves as a stop for positioning the blade and also the device holds the cutter head against rotation.

It is believed obvious that I have provided a simple, efficient and accurate apparatus for grinding the cutter blades on woodworking machinery.

What I claim and desire to secure by Letters Patent is:

Apparatus for grinding straight edges on the cutter blades while same are secured to the cutter head in a woodworking machine comprising, woodworking machine tables having work supporting surfaces on which wood is moved over the cutters, one of said tables being adjustable vertically relative to the cutter to be ground, a stop on the other table and engageable with the cutter for gauging the position of a cutter blade during grinding, means pivotally mounting said stop on said machine table for rotation about a vertical axis, means having releasable engagement with the stop and table for locking the stop on the table in position to engage a cutter blade, a lock means releasably and frictionally engaging the end of the cutter head and machine and wedged therebetween for holding the cutter head against rotation in either direction, a motor having a vertically arranged shaft, an abrasive wheel mounted on and rotatable with said motor shaft, a bracket having a horizontal face resting on and slidable on the work supporting surface of the adjustable table of the machine, a horizontally disposed arm carried by said bracket, and means on the arm for adjustably securing the motor thereto, whereby the abrasive wheel is moved along the cutter blade by sliding the bracket over the work supporting surface of the adjustable machine table and the cutting edge is ground parallel to the work supporting surface with the amount of the blade removed by the wheel determined by the vertical adjustment of said table.

BRUCE G. WALTERS.

REFERENCES CITED

The following references are of record in the file of this patent:

UNITED STATES PATENTS

| Number | Name | Date |
| --- | --- | --- |
| 609,301 | Scull | Aug. 16, 1898 |
| 856,726 | Ross | June 11, 1907 |
| 1,085,876 | Redden | Feb. 3, 1914 |
| 1,799,109 | Lyne | Mar. 31, 1931 |
| 2,282,145 | Indge | May 5, 1942 |
| 2,347,800 | Sjostrand | May 2, 1944 |
| 2,450,157 | Peckett | Sept. 28, 1948 |